United States Patent
Nowakowski

(10) Patent No.: US 10,793,262 B1
(45) Date of Patent: *Oct. 6, 2020

(54) MECHANICAL LINK WITH PRELOAD VERIFICATION

(71) Applicant: The Boeing Company, Chicago, IL (US)

(72) Inventor: Edward Joseph Nowakowski, Berkeley, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,745

(22) Filed: Jul. 17, 2019

(51) Int. Cl.
*B64C 25/58* (2006.01)
*F16C 7/04* (2006.01)
*F16C 3/02* (2006.01)

(52) U.S. Cl.
CPC ............... *B64C 25/58* (2013.01); *F16C 3/02* (2013.01); *F16C 7/04* (2013.01)

(58) Field of Classification Search
CPC ......... B64C 25/58; B64C 25/60; B64C 25/62; F16C 7/04; F16C 3/00; F16C 3/02; F16C 7/00; F16C 7/02; F16F 9/56
See application file for complete search history.

(56) References Cited

U.S. PATENT DOCUMENTS

| 4,012,967 | A | 3/1977 | Warren |
| 5,230,407 | A | 7/1993 | Smith et al. |
| 6,182,925 | B1 | 2/2001 | Kilner et al. |
| 7,234,664 | B1 * | 6/2007 | Anderson ............... B64C 25/50 244/100 R |
| 8,448,900 | B2 | 5/2013 | Mellor et al. |
| 8,998,133 | B2 | 4/2015 | Cottet |
| 9,345,352 | B2 * | 5/2016 | Shendelman ...... A47G 23/0625 |
| 9,481,452 | B2 | 11/2016 | Lindahl et al. |
| 2009/0050736 | A1 | 2/2009 | Bennett et al. |
| 2010/0219290 | A1 | 9/2010 | Luce |
| 2018/0208298 | A1 | 7/2018 | Cottet et al. |
| 2018/0281955 | A1 | 10/2018 | Boerschig |

OTHER PUBLICATIONS

Notice of Allowance, dated Oct. 29, 2019, regarding U.S. Appl. No. 16/514,712, 12 pages.

* cited by examiner

*Primary Examiner* — Jeremy R Severson
(74) *Attorney, Agent, or Firm* — Yee & Associates, P.C.

(57) ABSTRACT

A mechanical link (100) comprises a shaft (102) having a central axis (128). At least a portion of a first end portion (104) of the shaft (102) is received within an opening (142) of a first mounting interface (108) with a clearance fit. The shaft (102) is rotatable and translatable relative to the first mounting interface (108). A second mounting interface (110) is threadably coupled with a second end portion (106) of the shaft (102). A tubular sleeve (114) circumscribes a portion of the shaft (102) and comprises a slot (116). A pin (112) extends from the shaft (102) and passes through the slot (116). A stop (124) is coupled with the second end portion (106) and fixed to the shaft (102). A washer (126) circumscribes a portion of the shaft (102) between the tubular sleeve (114) and the stop (124). A spring (122) biases the tubular sleeve (114) toward the stop (124). A first jam nut (132) is threadably coupled with the second end portion (106) between the second mounting interface (110) and the stop (124).

20 Claims, 9 Drawing Sheets

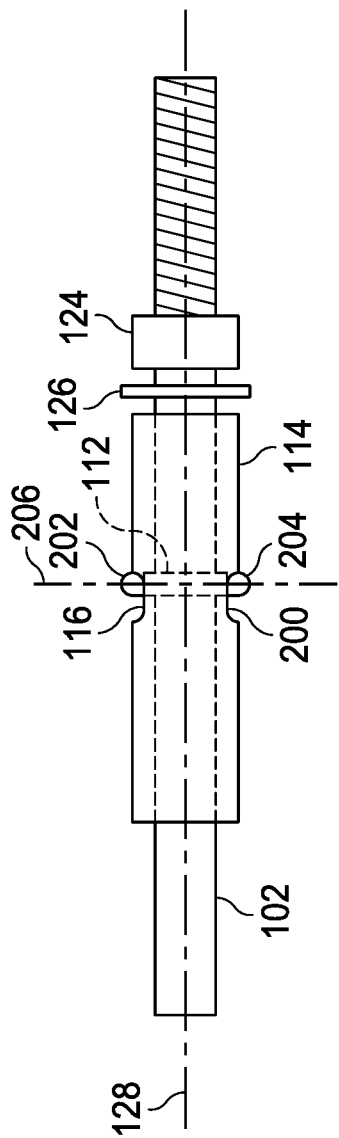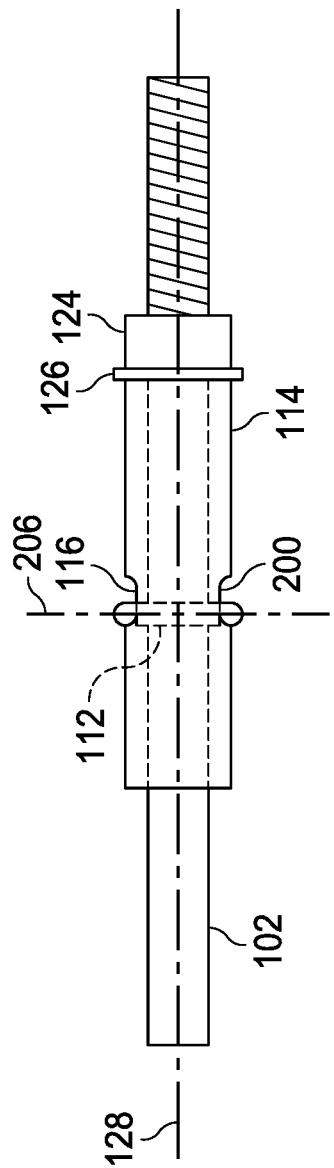
FIG. 2A
FIG. 2B

MECHANICAL LINK WITH PRELOAD VERIFICATION

BACKGROUND

Various mechanisms require preload in one or more of their kinematic states to operate properly as the mechanisms deflect under fluctuating loading. For example, in aircraft landing-gear mechanisms, mechanical linkages are furnished to provide the specified preload. However, landing-gear-mechanism preload values may change during exploitation of the aircraft. Currently, complicated and expensive equipment is required for measuring such preload in situ. Additionally, the mechanical linkage(s) must be removed from the landing-gear mechanism if preload adjustment is necessary, increasing maintenance costs and service time.

SUMMARY

Accordingly, apparatuses and methods, intended to address at least the above-identified concerns, would find utility.

The following is a non-exhaustive list of examples, which may or may not be claimed, of the subject matter according to the present disclosure.

Disclosed herein is a mechanical link. The mechanical link comprises a shaft, having a central axis and comprising a first end portion and a second end portion that opposes the first end portion along the central axis. The mechanical link further comprises a first mounting interface, comprising an opening. At least a portion of the first end portion of the shaft is received within the opening with a clearance fit. The shaft is rotatable and translatable relative to the first mounting interface. The mechanical link also comprises a second mounting interface, threadably coupled with the second end portion of the shaft. The mechanical link additionally comprises a tubular sleeve, circumscribing a portion of the shaft between the first end portion and the second end portion and comprising a slot. The mechanical link further comprises a pin, extending from the shaft in a direction, perpendicular to the central axis, such that the pin passes through the slot of the tubular sleeve. The mechanical link also comprises a stop, threadably coupled with the second end portion of the shaft and fixed to the shaft at a predetermined location along the second end portion of the shaft, such that the stop is not rotatable relative to the shaft. The mechanical link additionally comprises a washer, circumscribing a portion of the shaft between the tubular sleeve and the stop. The mechanical link further comprises a spring, positioned between the first mounting interface and the tubular sleeve and biasing the tubular sleeve toward the stop. The mechanical link also comprises a first jam nut, threadably coupled with the second end portion of the shaft and located between the second mounting interface and the stop.

The mechanical link as set forth above allows for preloading an associated mechanism to a desired preload level, and for facilitating simple periodic inspections of the mechanism to ensure presence of the required preload as the mechanism is subjected to continued use. The mechanical link provides a purely mechanical system that allows the associated mechanism to be rigged to a pre-determined preload level without specialized electronic equipment. The mechanical link allows a maintenance technician to easily and quickly check the mechanism to determine if the proper preload is being maintained in the mechanism. The mechanical link as set forth above allows for simple periodic walk-up inspections to determine if the associated mechanism has lost its preload.

Also disclosed herein is an aircraft landing gear. The aircraft landing gear comprises a mechanical link. The mechanical link comprises a shaft, having a central axis and comprising a first end portion and a second end portion that opposes the first end portion along the central axis. The mechanical link further comprises a first mounting interface, comprising an opening. At least a portion of the first end portion of the shaft is received within the opening with a clearance fit. The shaft is rotatable and translatable relative to the first mounting interface. The mechanical link also comprises a second mounting interface, threadably coupled with the second end portion of the shaft. The mechanical link additionally comprises a tubular sleeve, circumscribing a portion of the shaft between the first end portion and the second end portion and comprising a slot. The mechanical link further comprises a pin, extending from the shaft in a direction, perpendicular to the central axis, such that the pin passes through the slot of the tubular sleeve. The mechanical link also comprises a stop, threadably coupled with the second end portion of the shaft and fixed to the shaft at a predetermined location along the second end portion of the shaft, such that the stop is not rotatable relative to the shaft. The mechanical link additionally comprises a washer, circumscribing a portion of the shaft between the tubular sleeve and the stop. The mechanical link further comprises a spring, positioned between the first mounting interface and the tubular sleeve and biasing the tubular sleeve toward the stop. The mechanical link also comprises a first jam nut, threadably coupled with the second end portion of the shaft and located between the second mounting interface and the stop.

The aircraft landing gear, including the mechanical link as set forth above, allows for preloading the aircraft landing gear to a desired preload level, and for facilitating simple periodic inspections of the aircraft landing gear to ensure presence of the required preload as the aircraft landing gear is subjected to continued use. The mechanical link provides a purely mechanical system that allows the associated aircraft landing gear to be rigged to a pre-determined preload level without specialized electronic equipment. The mechanical link allows a maintenance technician to easily and quickly check the aircraft landing gear to determine if the proper preload is being maintained in the aircraft landing gear. The mechanical link as set forth above allows for simple periodic walk-up inspections to determine if the associated aircraft landing gear has lost its preload.

BRIEF DESCRIPTION OF THE DRAWINGS

Figure 1:
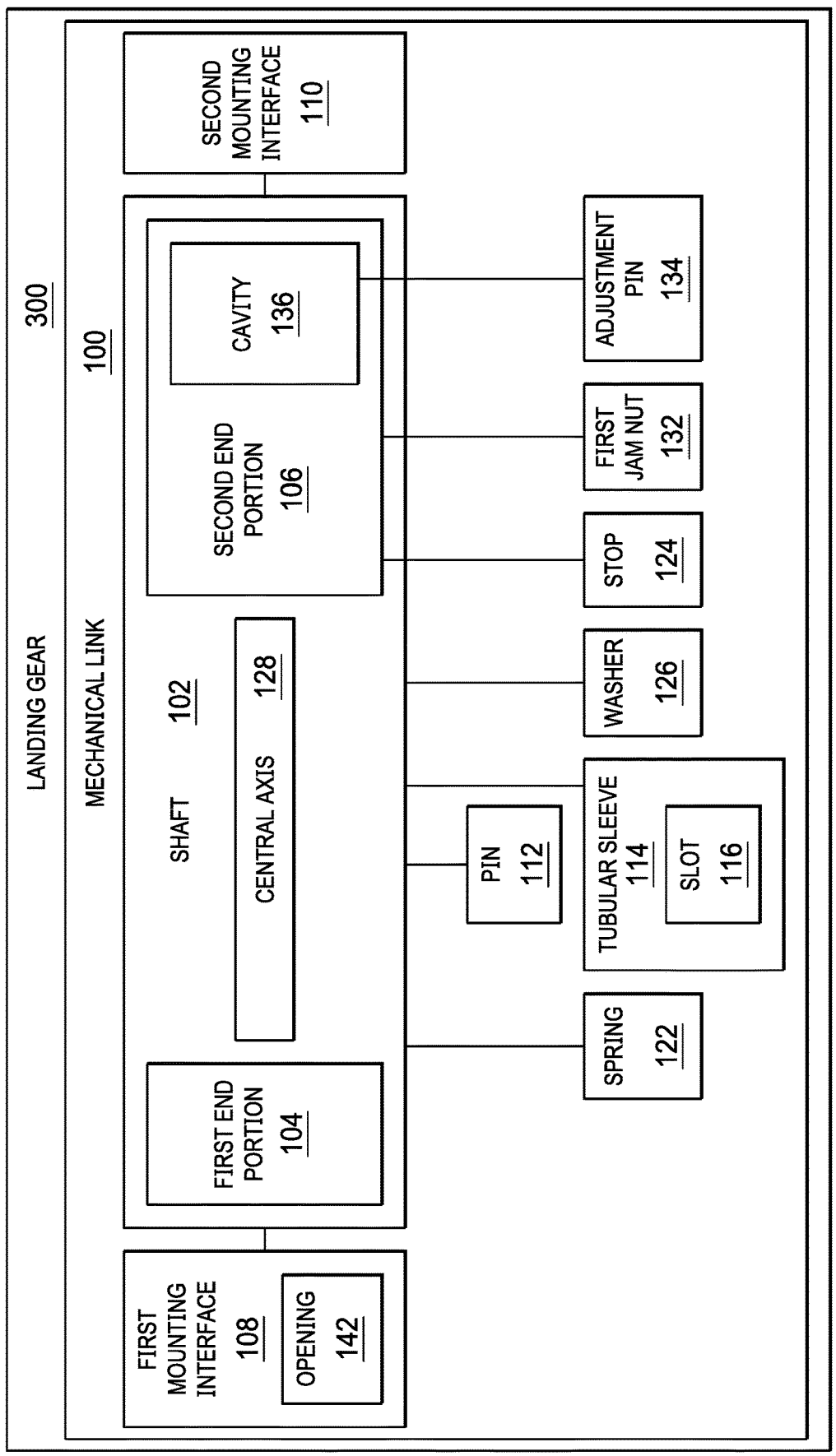
Figure 2:
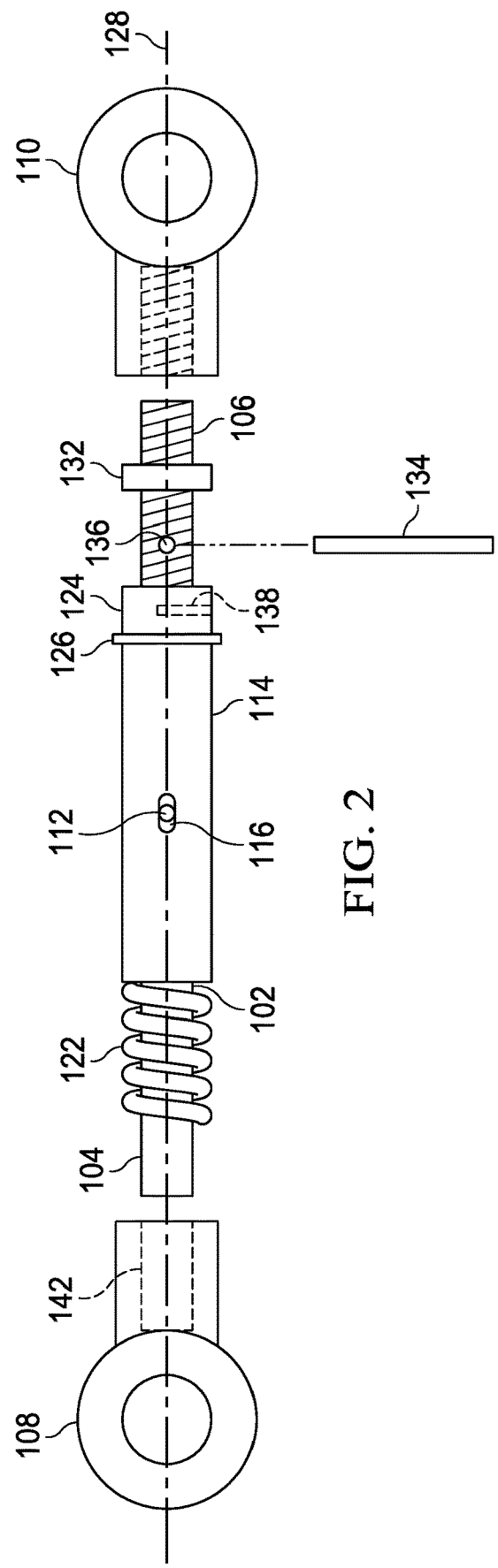
Figure 3:
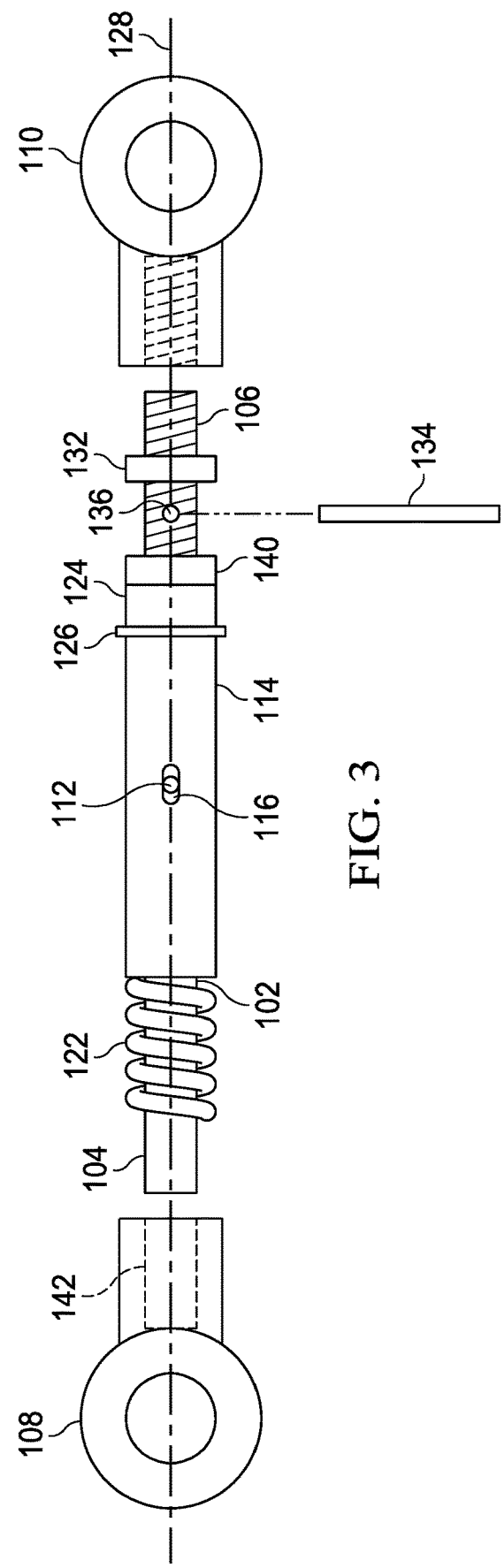
Figure 4:
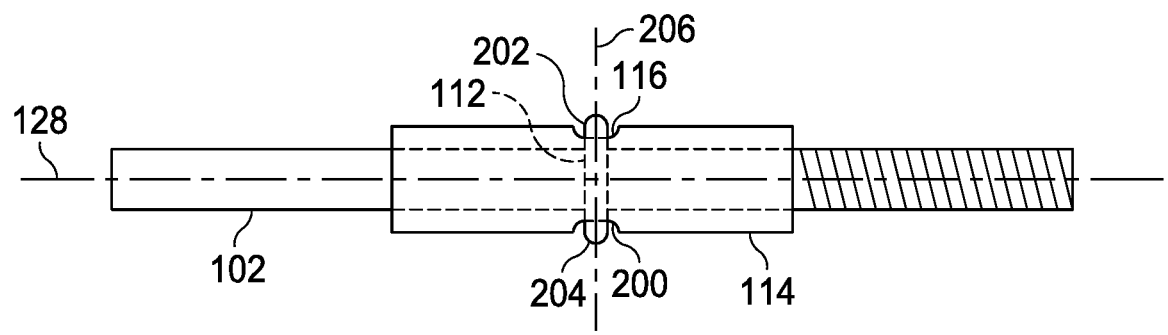
Figure 5:
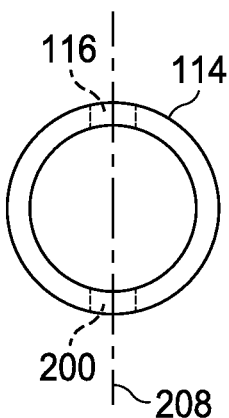
Figure 6:
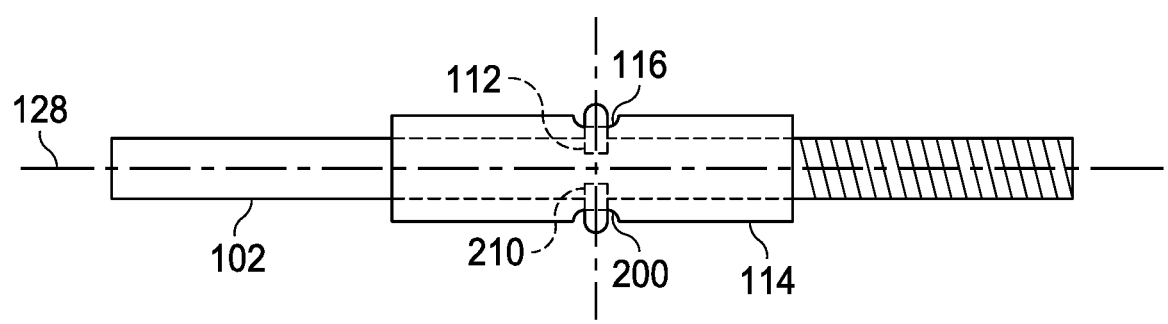
Figure 7:
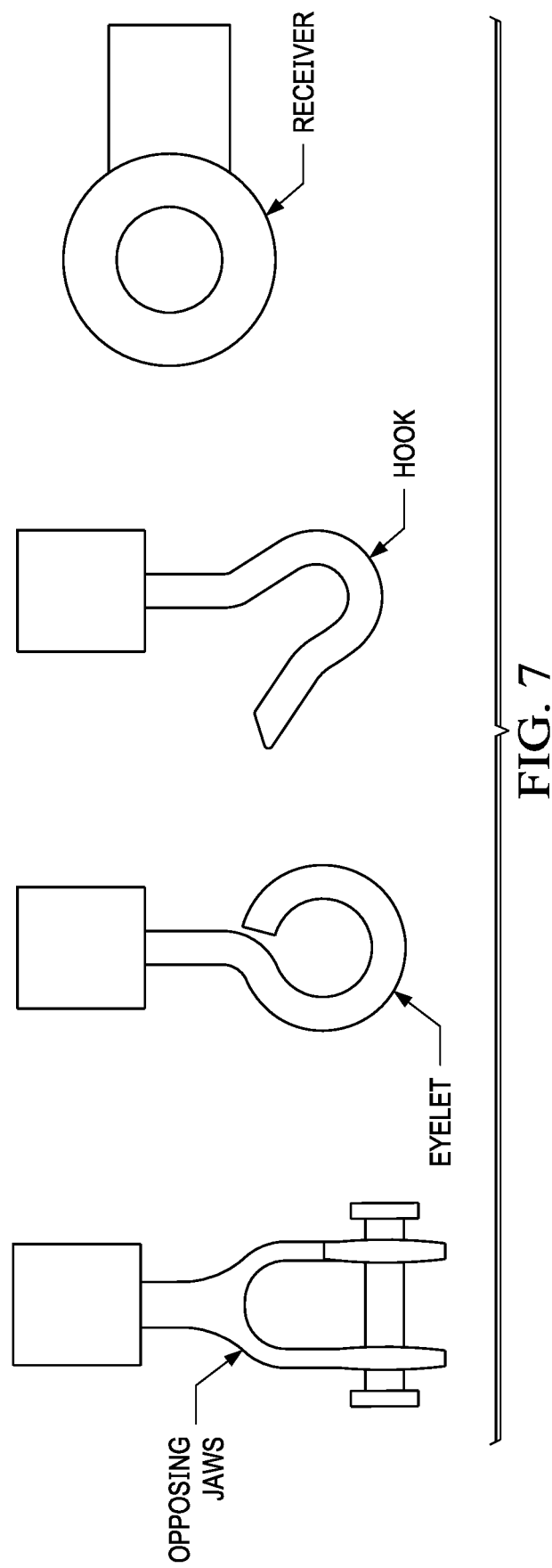
Figure 8:
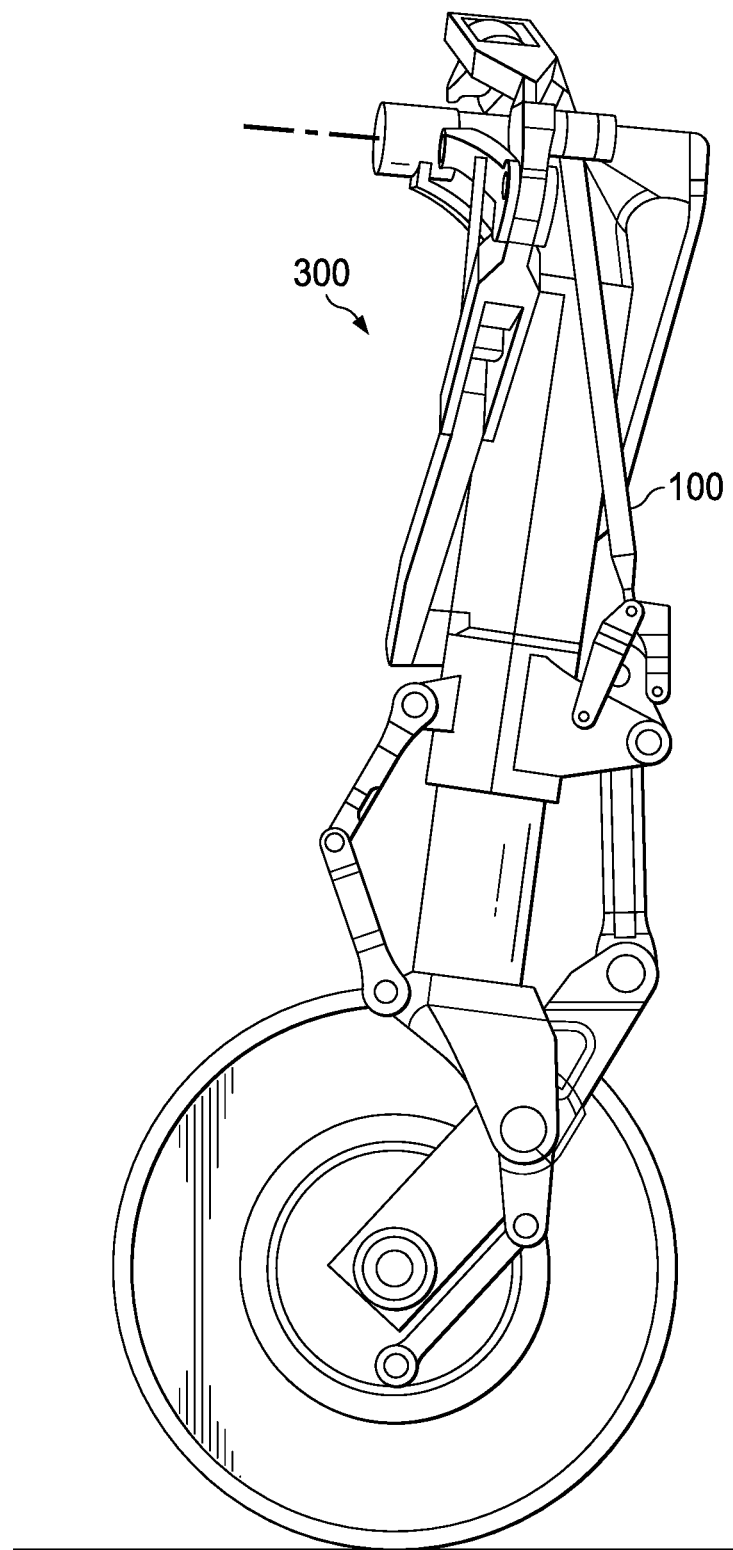
Figure 9:
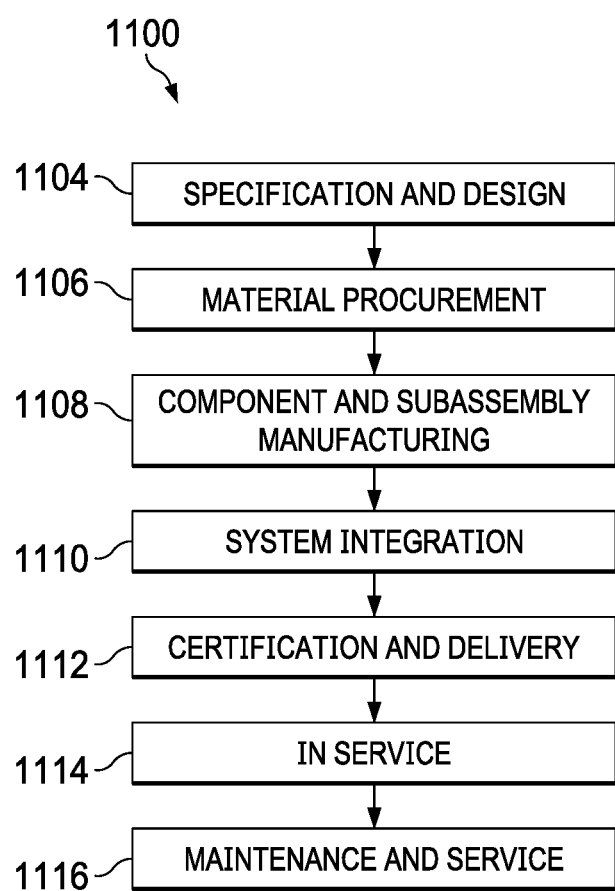

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a mechanical link, according to one or more examples of the present disclosure;

FIG. 2 is a schematic representation of the mechanical link of FIG. 1, according to one or more examples of the present disclosure;

FIG. 2A is a schematic representation of the mechanical link of FIG. 2, according to one or more examples of the present disclosure;

FIG. 2B is another schematic representation of the mechanical link of FIG. 2, according to one or more examples of the present disclosure;

FIG. 3 is another schematic representation of the mechanical link of FIG. 1, according to one or more examples of the present disclosure;

FIG. 4 is a schematic representation of a detail of the mechanical link of FIG. 1, according to one or more examples of the present disclosure;

FIG. 5 is a schematic, end view of the tubular sleeve of FIG. 4, according to one or more examples of the present disclosure;

FIG. 6 is another schematic representation of a detail of the mechanical link of FIG. 1, according to one or more examples of the present disclosure;

FIG. 7 is a schematic representation view of various configurations for the mounting interfaces of the mechanical link of FIG. 1, according to one or more examples of the present disclosure;

FIG. 8 is a schematic, side elevation view of an aircraft landing gear that comprises the mechanical link of FIG. 1, according to one or more examples of the present disclosure;

FIG. 9 is a block diagram of aircraft production and service methodology; and

Figure 10:
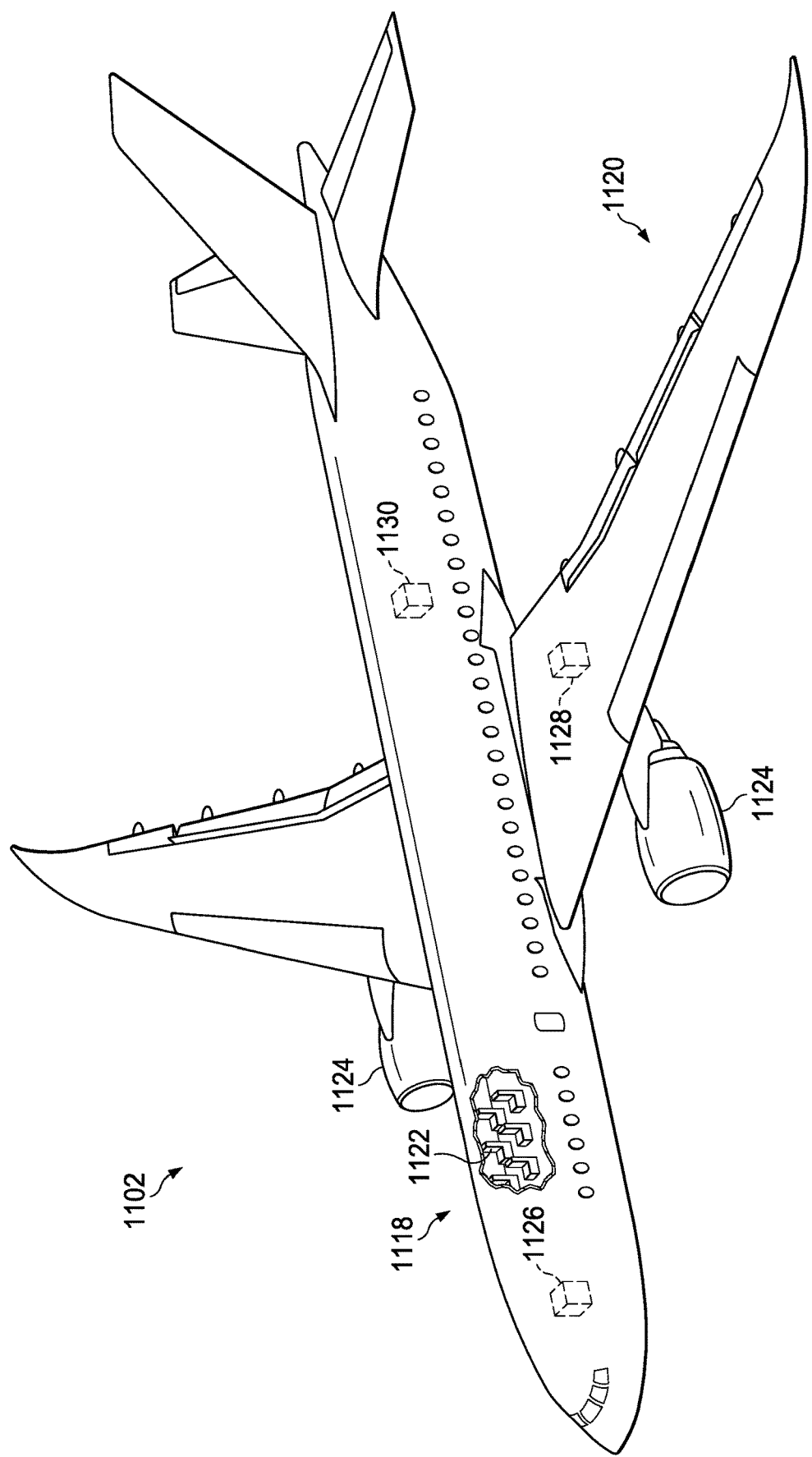

FIG. 10 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIG. 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2 and 3, mechanical link 100 is disclosed. Mechanical link 100 comprises shaft 102, having central axis 128 and comprising first end portion 104 and second end portion 106 that opposes first end portion 104 along central axis 128. Mechanical link 100 further comprises first mounting interface 108 comprising opening 142. At least a portion of first end portion 104 of shaft 102 is received within opening 142 with a clearance fit. Shaft 102 is rotatable and translatable relative to first mounting interface 108. Mechanical link 100 also comprises second mounting interface 110, threadably coupled with second end portion 106 of shaft 102. Mechanical link 100 additionally comprises tubular sleeve 114, circumscribing a portion of shaft 102 between first end portion 104 and second end portion 106 and comprising slot 116. Mechanical link 100 further comprises pin 112, extending from shaft 102 in a direction, perpendicular to central axis 128, such that pin 112 passes through slot 116 of tubular sleeve 114. Mechanical link 100 also comprises stop 124, threadably coupled with second end portion 106 of shaft 102 and fixed to shaft 102 at a predetermined location along second end portion 106 of shaft 102, such that stop 124 is not rotatable relative to shaft 102. Mechanical link 100 additionally comprises washer 126, circumscribing a portion of shaft 102 between tubular sleeve 114 and stop 124. Mechanical link 100 further comprises spring 122, positioned between first mounting interface 108 and tubular sleeve 114 and biasing tubular sleeve 114 toward stop 124. Mechanical link 100 also comprises first jam nut 132, threadably coupled with second end portion 106 of shaft 102 and located between second mounting interface 110 and stop 124. The preceding subject matter of this paragraph characterizes example 1 of the present disclosure.

Use of mechanical link 100 as set forth above allows for preloading an associated mechanism to a desired preload level, and for facilitating simple periodic inspections of the mechanism to ensure presence of the required preload as the mechanism is subjected to continued use. Mechanical link 100 provides a purely mechanical system that allows the associated mechanism to be rigged to a pre-determined preload level without specialized electronic equipment. Mechanical link 100 allows a maintenance technician easily to check the mechanism and quickly to determine if the proper preload is being maintained in the mechanism. Use of mechanical link 100 as set forth above allows for simple periodic walk-up inspections to determine if the associated mechanism has lost its preload. Use of mechanical link 100 as set forth above allows for a simpler rigging procedure of the mechanism that does not depend on an imposed displacement to determine preload.

In one or more examples, first end portion 104 of shaft 102 is received within opening 142 with a clearance fit. Shaft 102 is rotatable and translatable relative to first mounting interface 108. Second mounting interface 110 is threadably coupled with second end portion 106 of shaft 102. With first end portion 104 within opening 142 and second end portion 106 threaded, an overall length of shaft 102 is adjustable during rigging by rotating shaft 102 relative to both first mounting interface 108 and second mounting interface 110, without uninstalling mechanical link 100. When installed in the associated mechanism, adjusting the overall length of shaft 102 commensurately adjusts the applied preload.

In one or more examples, shaft 102 is configured to strain under preload stress. The preload stress is a compressive stress on mechanical link 100. In one or more examples, shaft 102 has a shape, suitable to slidably engage tubular sleeve 114. In one or more examples, shaft 102 has a circular cross-sectional shape.

Tubular sleeve 114 is configured to slidably engage shaft 102. In one or more examples, tubular sleeve 114 has a shape, suitable to slidably engage shaft 102. In one or more examples, tubular sleeve 114 has a circular cross-sectional shape. In one or more examples, tubular sleeve 114 is configured not to strain under an applied preload stress.

Spring 122 biases tubular sleeve 114 toward stop 124. Spring 122 is configured to enable relative sliding movement between tubular sleeve 114 and shaft 102, commensurate to the applied preload.

In one or more examples, stop 124 is configured to be adjustable along shaft 102 during a calibration step. Stop 124 can be fixed to shaft 102 at the predetermined location, corresponding to a desired preload stress. When stop 124 is fixed to shaft 102, stop 124 is not rotatable relative to shaft 102.

In one or more examples, second jam nut 140 secures stop 124 along shaft 104 at the predetermined location. It is possible to use lock-wire between second jam nut 140 and stop 124 to prevent loosening of second jam nut 140 due to vibration or other operational conditions.

Washer 126 is selectively configured between different rotational states commensurate with an applied preload stress. Depending on the preload stress in the mechanism, in which mechanical link 100 is installed, washer 126 will experience different types of fits between tubular sleeve 114 and stop 124, when washer 126 is rotated relative to shaft 102. In this manner, the applied preload stress relative to the desired preload stress for mechanical link 100 is indicated by a rotational state of washer 126 relative to shaft 102.

Washer 126 is configured to spin freely when mechanical link 100 experiences a desired preload stress. In one or more examples, washer 126 experiences a free or medium fit between tubular sleeve 114 and stop 124 when the applied preload stress is within desired preload tolerances. As used herein, when washer 126 experiences a free or medium fit, a maintenance technician is able to hand-rotate washer 126 by, but washer 126 does not exhibit perceptible freeplay, wobble, or shake between tubular sleeve 114 and stop 124.

As illustrated in FIG. 2A, washer 126 is configured to experience excessive free-play when mechanical link 100 experiences one type of undesirable preload stress. When mechanical link 100 is in compression, excessive free-play of washer 126 indicates that the applied preload stress is too low. In one or more examples, washer 126 experiences a loose fit between tubular sleeve 114 and stop 124 when the applied preload stress is outside of desired preload tolerances. As used herein, when washer 126 experiences a loose fit, washer 126 is freely rotatable, and exhibits perceptible freeplay, wobble, or shake between tubular sleeve 114 and stop 124.

As illustrated in FIG. 2B, washer 126 is configured to be unable to spin when mechanical link 100 experiences another type of undesirable preload stress. When mechanical link 100 is in compression, the inability of washer 126 to spin indicates that the applied preload stress is too high. In one or more examples, washer 126 experiences a force fit between tubular sleeve 114 and stop 124 when the applied preload stress is outside of desired preload tolerances. As used herein, when washer 126 experiences a force fit, either excessive resistance is felt when a maintenance technician hand-rotates washer 126, or washer 126 cannot be hand-rotated by a maintenance technician.

In one or more examples, after adjusting mechanical link 100 to a desired preload, first jam nut 132 secures second mounting interface 110 along shaft 104. It is possible to use lock-wire between first jam nut 132 and second mounting interface 110 to prevent loosening of first jam nut 132 due to vibration or other operational conditions.

Referring generally to FIG. 1 and particularly to, e.g., FIGS. 2, 3, and 7, first mounting interface 108 comprises one of a receiver, opposing jaws, an eyelet, or a hook. Second mounting interface 110 comprises one of a receiver, opposing jaws, an eyelet, or a hook. The preceding subject matter of this paragraph characterizes example 2 of the present disclosure, wherein example 2 also includes the subject matter according to example 1, above.

First mounting interface 108 and second mounting interface 110 enable installation of mechanical link 100 within a corresponding mechanism. In one or more examples, first mounting interface 108 couples first end portion 104 of mechanical link 100 to a first body of the mechanism. Second mounting interface 110 couples first end portion 104 of mechanical link 100 to a second body of the mechanism. In one or more examples, first mounting interface 108 and second mounting interface 110 have various configurations that are suitable for coupling mechanical link 100 to the various bodies of the mechanism in which mechanical link 100 is installed. In one or more examples, configurations of first mounting interface 108 and second mounting interface 110 are the same. In other examples, they are different from each other.

Referring generally to FIG. 1 and particularly to, e.g., FIGS. 2 to 6, tubular sleeve 114 has a clearance fit with shaft 102 along central axis 128. The preceding subject matter of this paragraph characterizes example 3 of the present disclosure, wherein example 3 also includes the subject matter according to example 1 or 2, above.

As used herein, a "clearance fit" is a fit between tubular sleeve 114 and shaft 102 wherein the diameter of tubular sleeve 114 is greater than the diameter of shaft 102, enabling the two parts to slide and/or rotate when assembled. Clearance fit of shaft 102 within tubular sleeve 114 allows for robust operation of mechanical link 100 under in-fleet conditions, where mechanical link 100 is exposed to wide temperature variation, corrosion effects, dust contamination, and thermal or mechanical deformations. In one or more examples, central axis 128 is a central longitudinal axis of shaft 102.

Referring generally to FIG. 1 and particularly to, e.g., FIGS. 2 to 4 and 6, slot 116 of tubular sleeve 114 is parallel to central axis 128 of shaft 102. The preceding subject matter of this paragraph characterizes example 4 of the present disclosure, wherein example 4 also includes the subject matter according to any one of examples 1 to 3, above.

In one or more examples, slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

Referring generally to FIG. 1 and particularly to, e.g., FIGS. 2 to 6, tubular sleeve 114 has radial axis 208, perpendicular to central axis 128 of shaft 102. Tubular sleeve 114 further comprises second slot 200, opposing slot 116 along radial axis 208. The preceding subject matter of this paragraph characterizes example 5 of the present disclosure, wherein example 5 also includes the subject matter according to any one of examples 1 to 4, above.

In one or more examples, slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

In one or more examples, tubular sleeve 114 comprises more than one slot. Second slot 200, opposing slot 116 along radial axis 208 of tubular sleeve 114, enables a maintenance technician easily to check the mechanism and quickly to determine if the proper preload is being maintained. Second slot 200, opposing slot 116, enables an easy check of the mechanism regardless of an installed orientation of mechanical link 100 that might otherwise obscure visual inspection of a single slot.

Referring generally to FIG. 1 and particularly to, e.g., FIGS. 2 to 5, pin 112 has pin axis 206, perpendicular to central axis 128 of shaft 102. Pin 112 comprises first end 202 that extends from shaft 102 along pin axis 206, such that first end 202 of pin 112 passes through slot 116 of tubular sleeve 114. Pin 112 further comprises second end 204, opposing first end 202 of pin 112 along pin axis 206 and extending from shaft 102 along pin axis 206, such that second end 204 of pin 112 passes through second slot 200 of tubular sleeve 114. The preceding subject matter of this paragraph characterizes example 6 of the present disclosure, wherein example 6 also includes the subject matter according to example 5, above.

Pin 112 could be configured in various ways. In one or more examples, pin 112 partially passes through shaft 102, with only one end extending from the surface of shaft 102. Alternatively, pin 112 is configured to have opposite ends, first end 202 and second end 204, protruding from opposite sides of shaft 102.

In one or more examples, slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

In one or more examples, the interaction between pin 112, and slot 116 limits relative movement between tubular sleeve 114 and shaft 102. Pin 112 limits travel of tubular sleeve 114 toward stop 124 with pin 112 contacts an edge of slot 116. Pin 112 limits travel of tubular sleeve 114 away from stop 124. The relative range of motion between shaft 102 and tubular sleeve 114 is therefore controlled by varying the length of slot 116.

When the length of slot 116 changes, the applied preload that is necessary to change the rotational state of washer 126 correspondingly changes as well. A larger length of slot 116 requires a larger applied preload before pin 112 contacts an edge of slot 116. Conversely, a smaller applied preload is required for pin 112 to contact an edge of slot 116 that has a smaller length. In one or more examples, it is appreciated that different elongate sizes of slot 116 define different preload tolerances for mechanical link 100.

Referring generally to FIG. 1 and particularly to, e.g., FIGS. 2, 3, 5, and 6, mechanical link 100 further comprises second pin 210 that extends from shaft 102 in second direction, such that second pin 210 passes through second slot 200 of tubular sleeve 114. Pin 112 extends from shaft 102 such that pin 112 passes through slot 116 of tubular sleeve 114. The preceding subject matter of this paragraph characterizes example 7 of the present disclosure, wherein example 7 also includes the subject matter according to example 5, above.

The pins could be configured in various ways. In one or more examples, pin 112 and second pin 210 have a shared central axis. Pin 112 and second pin 210 are configured to partially pass through shaft 102, with only one end of each of pin 112 and second pin 210 protruding from opposite sides of shaft 102.

In one or more examples, slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

In one or more examples, second slot 200, opposing slot 116 along radial axis 208 of tubular sleeve 114, enables a maintenance technician easily to check the mechanism and quickly to determine if the proper preload is being maintained. Second slot 200, opposing slot 116, enables an easy check of the mechanism regardless of an installed orientation of mechanical link 100 that might otherwise obscure visual inspection of a single slot.

Referring generally to FIG. 1 and particularly to, e.g., FIG. 2, mechanical link 100 further comprises stop pin 138, fixedly coupling stop 124 to shaft 102 at the predetermined location along second end portion 106 of shaft 102, such that stop 124 is neither translatable nor rotatable relative to shaft 102. The preceding subject matter of this paragraph characterizes example 8 of the present disclosure, wherein example 8 also includes the subject matter according to any one of examples 1 to 7, above.

Stop pin 138 enables stop 124 to be fixedly coupled to shaft 102 at the predetermined location. With stop 124 fixedly coupled to shaft 102, stop 124 is maintained at the predetermined location along shaft 102, preventing inadvertent displacement of stop 124 during rigging and subsequent operation.

Referring generally to FIG. 1 and particularly to, e.g., FIG. 3, mechanical link 100 further comprises second jam nut 140, threadably coupled with second end portion 106 of shaft 102 and located between stop 124 and first jam nut 132. Second jam nut 140 secures stop 124 to shaft 102 at the predetermined location along second end portion 106 of shaft 102, such that stop 124 is not rotatable relative to shaft 102. The preceding subject matter of this paragraph characterizes example 9 of the present disclosure, wherein example 9 also includes the subject matter according to any one of examples 1 to 7, above.

Second jam nut 140 enables stop 124 to be secured to shaft 102 at the predetermined location. With stop 124 secured to shaft 102, stop 124 is maintained at the predetermined location along shaft 102, preventing inadvertent displacement of stop 124 during rigging and subsequent operation.

Referring generally to FIG. 1 and particularly to, e.g., FIGS. 2 and 3, spring 122 biases tubular sleeve 114 toward stop 124 with biasing force F. A first friction force between tubular sleeve 114 and washer 126 is equal to a product of a first coefficient of friction between tubular sleeve 114 and washer 126 and biasing force F. A second friction force between stop 124 and washer 126 is equal to a product of a second coefficient of friction between stop 124 and washer 126 and biasing force F. The preceding subject matter of this paragraph characterizes example 10 of the present disclosure, wherein example 10 also includes the subject matter according to any one of examples 1 to 9, above.

Washer 126 is selectively configured between different rotational states commensurate with an applied preload stress. Depending on the preload stress in the mechanism and biasing force F, washer 126 will experience different types of fits between tubular sleeve 114 and stop 124, when washer 126 is rotated relative to shaft 102. In one or more examples, the applied preload stress relative to the desired preload stress for mechanical link 100 is indicated by a rotational state of washer 126 relative to shaft 102, dependent on biasing force F.

Referring generally to FIG. 1 and particularly to, e.g., FIGS. 2 and 3, the first friction force is different from the second friction force. The preceding subject matter of this paragraph characterizes example 11 of the present disclosure, wherein example 11 also includes the subject matter according to example 10, above.

In one or more examples, the first friction force is different from the second friction force. One or more of tubular sleeve 114, washer 126, and stop 124 have different surface finishes. Alternatively, one or more of tubular sleeve 114, washer 126, and stop 124 can be made from one or more different materials.

Referring generally to FIG. 1 and particularly to, e.g., FIGS. 2 and 3, the first friction force is identical to the second friction force. The preceding subject matter of this paragraph characterizes example 12 of the present disclosure, wherein example 12 also includes the subject matter according to example 10, above.

In one or more examples, the first friction force is identical to the second friction force. One or more of tubular sleeve 114, washer 126, and stop 124 have identical or similar surface finishes. Alternatively, one or more of tubular sleeve 114, washer 126, and stop 124 are made from one or more identical or similar materials.

Referring generally to FIG. 1 and particularly to, e.g., FIGS. 2 and 3, shaft 102 further comprises cavity 136, perpendicular to central axis 128. The preceding subject matter of this paragraph characterizes example 13 of the present disclosure, wherein example 13 also includes the subject matter according to any one of examples 1 to 12, above.

When shaft 102 further comprises cavity 136, a maintenance technician is better able to rotate shaft 102 relative to both first mounting interface 108 and second mounting interface 110 during rigging, thereby adjusting an overall length of shaft 102 as well as the applied preload, without uninstalling mechanical link 100 from the associated mechanism. In one or more examples, a tool, such as shaft-adjustment pin 134, is utilized as a lever arm in conjunction with cavity 136, enabling a maintenance technician to more easily rotate shaft 102.

Referring generally to FIG. 1 and particularly to, e.g., FIGS. 2 and 3, cavity 136 is located in second end portion 106 of shaft 102. The preceding subject matter of this paragraph characterizes example 14 of the present disclosure, wherein example 14 also includes the subject matter according to example 13, above.

When cavity 136 is located in second end portion 106 of shaft 102, spring 122 does not impede access to cavity 136 by a maintenance technician. The maintenance technician is better able to rotate shaft 102 relative to both first mounting interface 108 and second mounting interface 110 during rigging, thereby adjusting an overall length of shaft 102 as well as the applied preload, without uninstalling mechanical link 100 from the associated mechanism.

Referring generally to FIG. 1 and particularly to, e.g., FIGS. 2 and 3, cavity 136 is a blind cavity. The preceding subject matter of this paragraph characterizes example 15 of the present disclosure, wherein example 15 also includes the subject matter according to example 13 or 14, above.

When cavity 136 is a blind cavity, a maintenance technician is be better able to rotate shaft 102 relative to both first mounting interface 108 and second mounting interface 110 during rigging. In one or more examples, a tool, such as shaft-adjustment pin 134, is inserted into the blind cavity and utilized as a lever arm, enabling a maintenance technician to more easily rotate shaft 102.

Referring generally to FIG. 1 and particularly to, e.g., FIGS. 2 and 3, cavity 136 is a through cavity. The preceding subject matter of this paragraph characterizes example 16 of the present disclosure, wherein example 16 also includes the subject matter according to example 13 or 14, above.

When cavity 136 is a through cavity, a maintenance technician is better able to rotate shaft 102 relative to both first mounting interface 108 and second mounting interface 110 during rigging. In one or more examples, a tool, such as shaft-adjustment pin 134 is inserted through the through cavity and utilized as a lever arm, enabling a maintenance technician to more easily rotate shaft 102.

Referring generally to FIG. 1 and particularly to, e.g., FIGS. 2 and 3, mechanical link 100 further comprises shaft-adjustment pin 134, received within cavity 136. The preceding subject matter of this paragraph characterizes example 17 of the present disclosure, wherein example 17 also includes the subject matter according to any one of examples 13 to 16, above.

Shaft-adjustment pin 134 enables easier rotation of shaft 102. A maintenance technician inserts shaft-adjustment pin 134 into cavity 136. Shaft-adjustment pin 134 is thereafter used as a lever arm in conjunction with cavity 136, enabling the maintenance technician to more easily rotate shaft 102, thereby adjusting an overall length of shaft 102 as well as the applied preload, without uninstalling mechanical link 100 from the associated mechanism.

Referring generally to FIG. 1 and particularly to, e.g., FIGS. 2 and 3, shaft-adjustment pin 134 is received within cavity 136 with a clearance fit. The preceding subject matter of this paragraph characterizes example 18 of the present disclosure, wherein example 18 also includes the subject matter according to example 17, above.

Receiving shaft-adjustment pin 134 within cavity 136 with a clearance fit enables easier rotation of shaft 102. A maintenance technician removably inserts shaft-adjustment pin 134 into cavity 136. Shaft-adjustment pin 134 is thereafter used as a lever arm in conjunction with cavity 136, enabling the maintenance technician to more easily rotate shaft 102, thereby adjusting an overall length of shaft 102 as well as the applied preload, without uninstalling mechanical link 100 from the associated mechanism.

Referring generally to FIG. 1 and particularly to, e.g., FIGS. 2 and 3, shaft-adjustment pin 134 is fixed within cavity 136. The preceding subject matter of this paragraph characterizes example 19 of the present disclosure, wherein example 19 also includes the subject matter according to example 17, above.

Fixing shaft-adjustment pin 134 within cavity 136 enables easier rotation of shaft 102. Shaft-adjustment pin 134 is fixed within cavity 136 in any manner suitable to hinder removal of shaft-adjustment pin 134. In one or more examples, shaft-adjustment pin 134 is fixed within cavity 136 via an interference fit, welding, brazing, or threading, or any other suitable manner.

Referring generally to FIG. 1 and particularly to, e.g., FIGS. 2 and 3, cavity 136 has a depth and shaft-adjustment pin 134 has a length that is greater than the depth of cavity 136. The preceding subject matter of this paragraph characterizes example 20 of the present disclosure, wherein example 20 also includes the subject matter according to any one of examples 17 to 19, above.

In one or more examples, the difference between a depth of cavity 136 and a length of shaft-adjustment pin 134 is sufficient to enable rotation of shaft 102 manually, using a protruding portion of shaft-adjustment pin 134 as a lever arm. Using shaft-adjustment pin 134, a maintenance technician more easily rotates shaft 102, thereby adjusting an overall length of shaft 102 as well as the applied preload, without uninstalling mechanical link 100 from the associated mechanism.

Referring generally to FIG. 1, and particularly to, e.g., FIGS. 2, 3, and 8, aircraft landing gear 300 is disclosed. Aircraft landing gear 300 comprises mechanical link 100. Mechanical link 100 comprises shaft 102, having central axis 128 and comprising first end portion 104 and second end portion 106 that opposes first end portion 104 along central axis 128. Mechanical link 100 further comprises first mounting interface 108 comprising opening 142. At least a portion of first end portion 104 of shaft 102 is received within opening 142 with a clearance fit. Shaft 102 is rotatable and translatable relative to first mounting interface 108. Mechanical link 100 also comprises second mounting interface 110, threadably coupled with second end portion 106 of shaft 102. Mechanical link 100 additionally comprises tubular sleeve 114, circumscribing a portion of shaft 102 between first end portion 104 and second end portion 106 and comprising slot 116. Mechanical link 100 further comprises pin 112, extending from shaft 102 in a direction, perpendicular to central axis 128, such that pin 112 passes through slot 116 of tubular sleeve 114. Mechanical link 100 also comprises stop 124, threadably coupled with second end portion 106 of shaft 102 and fixed to shaft 102 at a predetermined location along second end portion 106 of shaft 102, such that stop 124 is not rotatable relative to shaft 102. Mechanical link 100 additionally comprises washer 126, circumscribing a portion of shaft 102 between tubular sleeve 114 and stop 124. Mechanical link 100 further comprises spring 122, positioned between first mounting interface 108 and tubular sleeve 114 and biasing tubular sleeve 114 toward stop 124. Mechanical link 100 also comprises first jam nut 132, threadably coupled with second end portion 106 of shaft 102 and located between second mounting interface 110 and stop 124. The preceding subject matter of this paragraph characterizes example 21 of the present disclosure.

Use of mechanical link 100 as set forth above allows for preloading aircraft landing gear 300 to a desired preload level, and for facilitating simple periodic inspections of aircraft landing gear 300 to ensure presence of the required preload as aircraft landing gear 300 is subjected to continued use. Mechanical link 100 provides a purely mechanical system that allows aircraft landing gear 300 to be rigged to a pre-determined preload level without specialized electronic equipment. Mechanical link 100 allows a maintenance technician to easily check aircraft landing gear 300 and quickly to determine if the proper preload is being maintained in aircraft landing gear 300. Use of mechanical link 100 as set forth above allows for simple periodic walk-up inspections to determine if aircraft landing gear 300 has lost its preload. Use of mechanical link 100 as set forth above allows for a simpler rigging procedure of aircraft landing gear 300 that does not depend on an imposed displacement to determine preload.

Referring generally to FIGS. 1 and 8, and particularly to, e.g., FIGS. 2, 3, and 7, first mounting interface 108 comprises one of a receiver, opposing jaws, an eyelet, or a hook; and second mounting interface 110 comprises one of a receiver, opposing jaws, an eyelet, or a hook. The preceding subject matter of this paragraph characterizes example 22 of the present disclosure, wherein example 22 also includes the subject matter according to example 21, above.

First mounting interface 108 and second mounting interface 110 enable installation of mechanical link 100 within aircraft landing gear 300. In one or more examples, first mounting interface 108 and second mounting interface 110 have various configurations that are suitable for coupling mechanical link 100 to the various bodies of aircraft landing gear 300 in which mechanical link 100 is installed. In one or more examples, the configurations of first mounting interface 108 and second mounting interface 110 are the same. In other examples, they are different from each other.

Referring generally to FIGS. 1 and 8, and particularly to, e.g., FIGS. 2 to 6, tubular sleeve 114 has a clearance fit with shaft 102 along central axis 128. The preceding subject matter of this paragraph characterizes example 23 of the present disclosure, wherein example 23 also includes the subject matter according to example 21 or 22, above.

Clearance fits of shaft 102 within tubular sleeve 114 allows for robust operation of mechanical link 100 under in-fleet conditions, where aircraft landing gear 300 is exposed to wide temperature variation, corrosion effects, dust contamination, and thermal or mechanical deformations. In one or more examples, central axis 128 is a central longitudinal axis of shaft 102.

Referring generally to FIGS. 1 and 8, and particularly to, e.g., FIGS. 2 to 4 and 6, slot 116 of tubular sleeve 114 is parallel to central axis 128 of shaft 102. The preceding subject matter of this paragraph characterizes example 24 of the present disclosure, wherein example 24 also includes the subject matter according to any one of examples 21 to 23, above.

In one or more examples, slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

Referring generally to FIGS. 1 and 8, and particularly to, e.g., 2 to 6, tubular sleeve 114 has radial axis 208, perpendicular to central axis 128 of shaft 102. Tubular sleeve 114 further comprises second slot 200, opposing slot 116 along radial axis 208. The preceding subject matter of this paragraph characterizes example 25 of the present disclosure, wherein example 25 also includes the subject matter according to any one of examples 21 to 24, above.

Slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

In one or more examples, tubular sleeve 114 comprises more than one slot. Second slot 200, opposing slot 116 along radial axis 208 of tubular sleeve 114, enables a maintenance technician easily to check the mechanism and quickly to determine if the proper preload is being maintained. Second slot 200, opposing slot 116, enables an easy check of the mechanism regardless of an installed orientation of mechanical link 100 that might otherwise obscure visual inspection of a single slot.

Referring generally to FIGS. 1 and 8, and particularly to, e.g., FIGS. 2 to 5, pin 112 has pin axis 206, perpendicular to central axis 128 of shaft 102. Pin 112 comprises first end 202 that extends from shaft 102 along pin axis 206, such that first end 202 of pin 112 passes through slot 116 of tubular sleeve 114. Pin 112 further comprises second end 204, opposing first end 202 of pin 112 along pin axis 206 and extending from shaft 102 along pin axis 206, such that second end 204 of pin 112 passes through second slot 200 of tubular sleeve 114. The preceding subject matter of this paragraph characterizes example 26 of the present disclosure, wherein example 26 also includes the subject matter according to example 25, above.

Pin 112 could be configured in various ways. In one or more examples, pin 112 partially passes through shaft 102, with only one end extending from the surface of shaft 102. Alternatively, pin 112 is configured to have opposite ends, first end 202 and second end 204, protruding from opposite sides of shaft 102.

In one or more examples, the interaction between pin 112, and slot 116 limits relative movement between tubular sleeve 114 and shaft 102. Pin 112 limits travel of tubular sleeve 114 toward stop 124 with pin 112 contacts an edge of slot 116. Pin 112 limits travel of tubular sleeve 114 away from stop 124. The relative range of motion between shaft 102 and tubular sleeve 114 is therefore controlled by varying the length of slot 116.

When the length of slot 116 changes, the applied preload that is necessary to change the rotational state of washer 126 correspondingly changes as well. In one or more examples, a larger length of slot 116 requires a larger applied preload before pin 112 contacts an edge of slot 116. Conversely, a smaller applied preload is required to contact pin 112 with an edge of slot 116 that has a smaller length. In one or more examples, different elongate sizes of slot 116 define different preload tolerances for mechanical link 100.

Referring generally to FIGS. 1 and 8, and particularly to, e.g., FIGS. 2, 3, 5, and 6, aircraft landing gear 300 further comprises second pin 210 that extends from shaft 102 in a second direction, such that second pin 210 passes through second slot 200 of tubular sleeve 114. Pin 112 extends from shaft 102 such that pin 112 passes through slot 116 of tubular sleeve 114. The preceding subject matter of this paragraph characterizes example 27 of the present disclosure, wherein example 27 also includes the subject matter according to example 25, above.

The pins could be configured in various ways. In one or more examples, pin 112 and second pin 210 have a shared central axis. Pin 112 and second pin 210 are configured to partially pass through shaft 102, with only one end of each of pin 112 and second pin 210 protruding from opposite sides of shaft 102.

In one or more examples, slot 116 is elongate in a direction, parallel to central axis 128. When slot 116 is parallel to central axis 128, relative movement between tubular sleeve 114 and shaft 102 produces a corresponding relative movement of pin 112 and slot 116. In one or more examples, slot 116 is positioned along tubular sleeve 114 commensurate to a desired preload stress for mechanical link 100.

In one or more examples, second slot 200, opposing slot 116 along radial axis 208 of tubular sleeve 114, enables a maintenance technician easily to check the mechanism and quickly to determine if the proper preload is being maintained. Second slot 200, opposing slot 116, enables an easy check of the mechanism regardless of an installed orientation of mechanical link 100 that might otherwise obscure visual inspection of a single slot.

Referring generally to FIGS. 1 and 8, and particularly to, e.g., FIG. 2, aircraft landing gear 300 further comprises stop pin 138, fixedly coupling stop 124 to shaft 102 at the predetermined location along second end portion 106 of shaft 102, such that stop 124 is neither translatable nor rotatable relative to shaft 102. The preceding subject matter of this paragraph characterizes example 28 of the present disclosure, wherein example 28 also includes the subject matter according to any one of examples 21 to 27, above.

Stop pin 138 enables stop 124 to be fixedly coupled to shaft 102 at the predetermined location. With stop 124 fixedly coupled to shaft 102, stop 124 is maintained at the predetermined location along shaft 102, preventing inadvertent displacement of stop 124 during rigging and subsequent operation.

Referring generally to FIGS. 1 and 8, and particularly to, e.g., FIG. 3, aircraft landing gear 300 further comprises second jam nut 140, threadably coupled with second end portion 106 of shaft 102 and located between stop 124 and first jam nut 132. Second jam nut 140 secures stop 124 to shaft 102 at the predetermined location along second end portion 106 of shaft 102, such that stop 124 is not rotatable relative to shaft 102. The preceding subject matter of this paragraph characterizes example 29 of the present disclosure, wherein example 29 also includes the subject matter according to any one of examples 21 to 27, above.

Second jam nut 140 enables stop 124 to be secured to shaft 102 at the predetermined location. With stop 124 secured to shaft 102, stop 124 is maintained at the predetermined location along shaft 102, preventing inadvertent displacement of stop 124 during rigging and subsequent operation.

Referring generally to FIGS. 1 and 8, and particularly to, e.g., FIGS. 2 and 3, spring 122 biases tubular sleeve 114 toward stop 124 with biasing force F. A first friction force between tubular sleeve 114 and washer 126 is equal to a product of a first coefficient of friction between tubular sleeve 114 and washer 126 and biasing force F. A second friction force between stop 124 and washer 126 is equal to a product of a second coefficient of friction between stop 124 and washer 126 and biasing force F. The preceding subject matter of this paragraph characterizes example 30 of the present disclosure, wherein example 30 also includes the subject matter according to any one of examples 21 to 29, above.

Washer 126 is selectively configured between different rotational states commensurate with an applied preload stress. Depending on the preload stress in the mechanism and biasing force F, washer 126 will experience different types of fits between tubular sleeve 114 and stop 124, when washer 126 is rotated relative to shaft 102. In one or more examples, the applied preload stress relative to the desired preload stress for mechanical link 100 is indicated by a rotational state of washer 126 relative to shaft 102, dependent on biasing force F.

Referring generally to FIGS. 1 and 8, and particularly to, e.g., FIGS. 2 and 3, the first friction force is different from the second friction force. The preceding subject matter of this paragraph characterizes example 31 of the present disclosure, wherein example 31 also includes the subject matter according to example 30, above.

In one or more examples, the first friction force is different from the second friction force. One or more of tubular sleeve 114, washer 126, and stop 124 have different surface finishes. Alternatively, one or more of tubular sleeve 114, washer 126, and stop 124 can be made from one or more different materials.

Referring generally to FIGS. 1 and 8, and particularly to, e.g., FIGS. 2 and 3, the first friction force is identical to the second friction force. The preceding subject matter of this paragraph characterizes example 32 of the present disclosure, wherein example 32 also includes the subject matter according to example 30, above.

In one or more examples, the first friction force is identical to the second friction force. One or more of tubular sleeve 114, washer 126, and stop 124 can have identical or similar surface finishes. Alternatively, one or more of tubular sleeve 114, washer 126, and stop 124 can be made from one or more identical or similar materials.

Referring generally to FIGS. 1 and 8, and particularly to, e.g., FIGS. 2 and 3, shaft 102 further comprises cavity 136, perpendicular to central axis 128. The preceding subject matter of this paragraph characterizes example 33 of the present disclosure, wherein example 33 also includes the subject matter according to any one of examples 21 to 32, above.

When shaft 102 further comprises cavity 136, a maintenance technician is better able to rotate shaft 102 relative to both first mounting interface 108 and second mounting interface 110 during rigging, thereby adjusting an overall length of shaft 102 as well as the applied preload, without uninstalling mechanical link 100 from aircraft landing gear 300. In one or more examples, a tool, such as shaft-adjustment pin 134 is utilized as a lever arm in conjunction with cavity 136, enabling a maintenance technician to more easily rotate shaft 102.

Referring generally to FIGS. 1 and 8, and particularly to, e.g., FIGS. 2 and 3, cavity 136 is located in second end portion 106 of shaft 102. The preceding subject matter of this paragraph characterizes example 34 of the present disclosure, wherein example 34 also includes the subject matter according to example 33, above.

When cavity 136 is located in second end portion 106 of shaft 102, spring 122 does not impede access to cavity 136 by a maintenance technician. The maintenance technician is better able to rotate shaft 102 relative to both first mounting interface 108 and second mounting interface 110 during rigging, thereby adjusting an overall length of shaft 102 as well as the applied preload, without uninstalling mechanical link 100 from aircraft landing gear 300.

Referring generally to FIGS. 1 and 8, and particularly to, e.g., FIGS. 2 and 3, cavity 136 is a blind cavity. The preceding subject matter of this paragraph characterizes example 35 of the present disclosure, wherein example 35 also includes the subject matter according to example 33 or 34, above.

When cavity 136 is a blind cavity, a maintenance technician is better able to rotate shaft 102 relative to both first mounting interface 108 and second mounting interface 110 during rigging. In one or more examples, a tool, such as shaft-adjustment pin 134 is inserted into the blind cavity and utilized as a lever arm, enabling a maintenance technician to more easily rotate shaft 102.

Referring generally to FIGS. 1 and 8, and particularly to, e.g., FIGS. 2 and 3, cavity 136 is a through cavity. The preceding subject matter of this paragraph characterizes example 36 of the present disclosure, wherein example 36 also includes the subject matter according to example 33 or 34, above.

When cavity 136 is a through cavity, a maintenance technician is better able to rotate shaft 102 relative to both first mounting interface 108 and second mounting interface 110 during rigging. In one or more examples, a tool, such as shaft-adjustment pin 134 is inserted through the through cavity and utilized as a lever arm, enabling a maintenance technician to more easily rotate shaft 102.

Referring generally to FIGS. 1 and 8, and particularly to, e.g., FIGS. 2 and 3, aircraft landing gear 300 further comprises shaft-adjustment pin 134, received within cavity 136. The preceding subject matter of this paragraph characterizes example 37 of the present disclosure, wherein example 37 also includes the subject matter according to any one of examples 33 to 36, above.

Shaft-adjustment pin 134 enables easier rotation of shaft 102. A maintenance technician inserts shaft-adjustment pin 134 into cavity 136. Shaft-adjustment pin 134 is thereafter used as a lever arm in conjunction with cavity 136, enabling the maintenance technician to more easily rotate shaft 102, thereby adjusting an overall length of shaft 102 as well as the applied preload, without uninstalling mechanical link 100 from aircraft landing gear 300.

Referring generally to FIGS. 1 and 8, and particularly to, e.g., FIGS. 2 and 3, shaft-adjustment pin 134 is received within cavity 136 with a clearance fit. The preceding subject matter of this paragraph characterizes example 38 of the present disclosure, wherein example 38 also includes the subject matter according to example 37, above.

Receiving shaft-adjustment pin 134 within cavity 136 with a clearance fit enables easier rotation of shaft 102. A maintenance technician removably inserts shaft-adjustment pin 134 into cavity 136. Shaft-adjustment pin 134 is thereafter used as a lever arm in conjunction with cavity 136, enabling the maintenance technician to more easily rotate shaft 102, thereby adjusting an overall length of shaft 102 as well as the applied preload, without uninstalling mechanical link 100 from aircraft landing gear 300.

Referring generally to FIGS. 1 and 8, and particularly to, e.g., FIGS. 2 and 3, shaft-adjustment pin 134 is fixed within cavity 136. The preceding subject matter of this paragraph characterizes example 39 of the present disclosure, wherein example 39 also includes the subject matter according to example 37, above.

Fixing shaft-adjustment pin 134 within cavity 136 enables easier rotation of shaft 102. Shaft-adjustment pin 134 is fixed within cavity 136 in any manner suitable to hinder removal of shaft-adjustment pin 134. In one or more examples, shaft-adjustment pin 134 is fixed within cavity 136 via an interference fit, welding, brazing, or threading, or any other suitable manner.

Referring generally to FIGS. 1 and 8, and particularly to, e.g., FIGS. 2 and 3, cavity 136 has a depth and shaft-adjustment pin 134 has a length that is greater than the depth of cavity 136. The preceding subject matter of this paragraph characterizes example 40 of the present disclosure, wherein example 40 also includes the subject matter according to any one of examples 37 to 39, above.

The difference between a depth of cavity 136 and a length of shaft-adjustment pin 134 is sufficient to enable rotation of shaft 102 manually, using a protruding portion of shaft-adjustment pin 134 as a lever arm. Using shaft-adjustment pin 134, a maintenance technician more easily rotates shaft 102, thereby adjusting an overall length of shaft 102 as well as the applied preload, without uninstalling mechanical link 100 from aircraft landing gear 300.

Examples of the present disclosure may be described in the context of aircraft manufacturing and service method 1100 as shown in FIG. 9 and aircraft 1102 as shown in FIG. 10. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A mechanical link (100), comprising:
   a shaft (102), having a central axis (128) and comprising a first end portion (104) and a second end portion (106) that opposes the first end portion (104) along the central axis (128);
   a first mounting interface (108), comprising an opening (142); and wherein:
      at least a portion of the first end portion (104) of the shaft (102) is received within the opening (142) with a clearance fit, and
      the shaft (102) is rotatable and translatable relative to the first mounting interface (108);
   a second mounting interface (110), threadably coupled with the second end portion (106) of the shaft (102);
   a tubular sleeve (114), circumscribing a portion of the shaft (102) between the first end portion (104) and the second end portion (106) and comprising a slot (116);
   a pin (112), extending from the shaft (102) in a direction, perpendicular to the central axis (128), such that the pin (112) passes through the slot (116) of the tubular sleeve (114);
   a stop (124), threadably coupled with the second end portion (106) of the shaft (102) and fixed to the shaft (102) at a predetermined location along the second end portion (106) of the shaft (102), such that the stop (124) is not rotatable relative to the shaft (102);
   a washer (126), circumscribing a portion of the shaft (102) between the tubular sleeve (114) and the stop (124);
   a spring (122), positioned between the first mounting interface (108) and the tubular sleeve (114) and biasing the tubular sleeve (114) toward the stop (124); and
   a first jam nut (132), threadably coupled with the second end portion (106) of the shaft (102) and located between the second mounting interface (110) and the stop (124).

2. The mechanical link (100) according to claim 1, wherein:
   the first mounting interface (108) comprises one of a receiver, opposing jaws, an eyelet, or a hook; and
   the second mounting interface (110) comprises one of a receiver, opposing jaws, an eyelet, or a hook.

3. The mechanical link (100) according to claim 1, wherein the tubular sleeve (114) has a clearance fit with the shaft (102) along the central axis (128).

4. The mechanical link (100) according to claim 1, wherein the slot (116) of the tubular sleeve (114) is parallel to the central axis (128) of the shaft (102).

5. The mechanical link (100) according to claim 1, wherein the tubular sleeve (114) has a radial axis (208), perpendicular to the central axis (128) of the shaft (102), and further comprises a second slot (200), opposing the slot (116) along the radial axis (208).

6. The mechanical link (100) according to claim 5, wherein:
   the pin (112) has a pin axis (206), perpendicular to the central axis (128) of the shaft (102); and
   the pin (112) comprises:
      a first end (202) that extends from the shaft (102) along the pin axis (206), such that the first end (202) of the pin (112) passes through the slot (116) of the tubular sleeve (114); and
      a second end (204), opposing the first end (202) of the pin (112) along the pin axis (206) and extending from the shaft (102) along the pin axis (206), such that the second end (204) of the pin (112) passes through the second slot (200) of the tubular sleeve (114).

7. The mechanical link (100) according to claim 5, further comprising:
   a second pin (210) that extends from the shaft (102) in a second direction, such that the second pin (210) passes through the second slot (200) of the tubular sleeve (114); and
   wherein the pin (112) extends from the shaft (102) such that the pin (112) passes through the slot (116) of the tubular sleeve (114).

8. The mechanical link (100) according to claim 1, further comprising a stop pin (138), fixedly coupling the stop (124) to the shaft (102) at the predetermined location along the second end portion (106) of the shaft (102), such that the stop (124) is neither translatable nor rotatable relative to the shaft (102).

9. The mechanical link (100) according to claim 1, further comprising:
   a second jam nut (140), threadably coupled with the second end portion (106) of the shaft (102) and located between the stop (124) and the first jam nut (132); and
   wherein the second jam nut (140) secures the stop (124) to the shaft (102) at the predetermined location along the second end portion (106) of the shaft (102), such that the stop (124) is not rotatable relative to the shaft (102).

10. The mechanical link (100) according to claim 1, wherein:
    the spring (122) biases the tubular sleeve (114) toward the stop (124) with a biasing force (F);
    a first friction force between the tubular sleeve (114) and the washer (126) is equal to a product of a first coefficient of friction between the tubular sleeve (114) and the washer (126) and the biasing force (F); and
    a second friction force between the stop (124) and the washer (126) is equal to a product of a second coefficient of friction between the stop (124) and the washer (126) and the biasing force (F).

11. The mechanical link (100) according to claim 10, wherein the first friction force is different from the second friction force.

12. The mechanical link (100) according to claim 10, wherein the first friction force is identical to the second friction force.

13. The mechanical link (100) according to claim 1, wherein the shaft (102) further comprises a cavity (136), perpendicular to the central axis (128).

14. The mechanical link (100) according to claim 13, wherein the cavity (136) is located in the second end portion (106) of the shaft (102).

15. The mechanical link (100) according to claim 13, wherein the cavity (136) is a blind cavity.

16. The mechanical link (100) according to claim 13, wherein the cavity (136) is a through cavity.

17. The mechanical link (100) according to claim 13, further comprising a shaft-adjustment pin (134), configured to be received within the cavity (136).

18. The mechanical link (100) according to claim 17, wherein the shaft-adjustment pin (134) is configured to be received within the cavity (136) with a clearance fit.

19. The mechanical link (100) according to claim 17, wherein the shaft-adjustment pin (134) is fixed within the cavity (136).

20. An aircraft landing gear (300), comprising a mechanical link (100) that comprises:

a shaft (102), having a central axis (128) and comprising a first end portion (104) and a second end portion (106) that opposes the first end portion (104) along the central axis (128);

a first mounting interface (108), comprising an opening (142); and wherein:
- at least a portion of the first end portion (104) of the shaft (102) is received within the opening (142) with a clearance fit, and
- the shaft (102) is rotatable and translatable relative to the first mounting interface (108);

a second mounting interface (110), threadably coupled with the second end portion (106) of the shaft (102);

a tubular sleeve (114), circumscribing a portion of the shaft (102) between the first end portion (104) and the second end portion (106) and comprising a slot (116);

a pin (112), extending from the shaft (102) in a direction, perpendicular to the central axis (128), such that the pin (112) passes through the slot (116) of the tubular sleeve (114);

a stop (124), threadably coupled with the second end portion (106) of the shaft (102) and fixed to the shaft (102) at a predetermined location along the second end portion (106) of the shaft (102), such that the stop (124) is not rotatable relative to the shaft (102);

a washer (126), circumscribing a portion of the shaft (102) between the tubular sleeve (114) and the stop (124);

a spring (122), positioned between the first mounting interface (108) and the tubular sleeve (114) and biasing the tubular sleeve (114) toward the stop (124); and a first jam nut (132), threadably coupled with the second end portion (106) of the shaft (102) and located between the second mounting interface (110) and the stop (124).

* * * * *